(12) United States Patent
Koluguri et al.

(10) Patent No.: US 12,417,760 B2
(45) Date of Patent: Sep. 16, 2025

(54) SPEAKER IDENTIFICATION, VERIFICATION, AND DIARIZATION USING NEURAL NETWORKS FOR CONVERSATIONAL AI SYSTEMS AND APPLICATIONS

(71) Applicant: NVIDIA Corporation, Santa Clara, CA (US)

(72) Inventors: Nithin Rao Koluguri, San Jose, CA (US); Taejin Park, San Jose, CA (US); Boris Ginsburg, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 207 days.

(21) Appl. No.: 17/962,248

(22) Filed: Oct. 7, 2022

(65) Prior Publication Data
US 2024/0119927 A1    Apr. 11, 2024

(51) Int. Cl.
*G10L 15/16* (2006.01)
*G06N 3/08* (2023.01)
*G10L 15/06* (2013.01)

(52) U.S. Cl.
CPC .............. *G10L 15/16* (2013.01); *G06N 3/08* (2013.01); *G10L 15/063* (2013.01)

(58) Field of Classification Search
CPC .......... G10L 15/16; G10L 15/063; G06N 3/08
USPC ................ 704/202, 231–232, 235, 239, 246
See application file for complete search history.

(56) References Cited

U.S. PATENT DOCUMENTS

| | | | |
|---|---|---|---|
| 11,158,307 | B1 | 10/2021 | Ghias et al. |
| 12,100,383 | B1 | 9/2024 | Ezzerg et al. |
| 2020/0058290 | A1 | 2/2020 | Chae et al. |
| 2020/0302223 | A1 | 9/2020 | Dutta et al. |
| 2020/0394997 | A1 | 12/2020 | Trueba et al. |

(Continued)

FOREIGN PATENT DOCUMENTS

| | | |
|---|---|---|
| JP | 2015102667 A | 6/2015 |
| WO | 2022063758 A1 | 3/2022 |

OTHER PUBLICATIONS

Garcia-Romero, D. et al., "Speaker Diarization Using Deep Neural Network Embeddings", IEEE International Conference on Acoustics, Speech and Signal Processing (ICASSP), pp. 4930-4934, Mar. 5, 2017.

(Continued)

*Primary Examiner* — George C Monikang
(74) *Attorney, Agent, or Firm* — Lowenstein Sandler LLP

(57) ABSTRACT

Disclosed are apparatuses, systems, and techniques that may use machine learning for implementing speaker recognition, verification, and/or diarization. The techniques include applying a neural network (NN) to a speech data to obtain a speaker embedding representative of an association between the speech data and a speaker that produced the speech. The speech data includes a plurality of frames and a plurality of channels representative of spectral content of the speech data. The NN has one or more blocks of neurons that include a first branch performing convolutions of the speech data across the plurality of channels and across the plurality of frames and a second branch performing convolutions of the speech data across the plurality of channels. Obtained speaker embeddings may be used for various tasks of speaker identification, verification, and/or diarization.

19 Claims, 11 Drawing Sheets

(56) References Cited

U.S. PATENT DOCUMENTS

| | | | |
|---|---|---|---|
| 2020/0402497 | A1 | 12/2020 | Semenov et al. |
| 2021/0224319 | A1 | 7/2021 | Ingel et al. |
| 2021/0304769 | A1 | 9/2021 | Ye et al. |
| 2022/0028367 | A1* | 1/2022 | Shekhar ............... G10L 13/047 |
| 2022/0051654 | A1 | 2/2022 | Finkelstein et al. |
| 2022/0093106 | A1* | 3/2022 | Mosayyebpour Kaskari .............. G06N 3/044 |
| 2022/0223144 | A1* | 7/2022 | Sun ......................... G10L 15/16 |
| 2022/0319018 | A1 | 10/2022 | Gervais et al. |
| 2023/0150498 | A1 | 5/2023 | Seong et al. |
| 2024/0037316 | A1* | 2/2024 | Mohanty ............... G06F 16/345 |
| 2024/0104055 | A1 | 3/2024 | McAnallen |
| 2024/0105289 | A1* | 3/2024 | Khan ..................... G16H 15/00 |

OTHER PUBLICATIONS

Han, W. et al., "ContextNet: Improving Convolutional Neural Networks for Automatic Speech Recognition with Global Context", arXiv preprint arXiv:2005.03191 (2020).
Kingma, D. et al., "Improved Variational Inference with Inverse Autoregressive Flow", 30th Conference on Neural Information Processing Systems, 9 pages, 2016.
Koluguri, N. et al., "Titanet: Neural Model for Speaker Representation With 1D Depth-Wise Separable Convolutions and Global Context", International Conference on Acoustics, Speech and Signal Processing, pp. 8102-8106, May 2022.
Lancucki, Adrian, "Fastpitch: Parallel Text-to-Speech with Pitch Prediction", In ICASSP 2021—2021 IEEE International Conference on Acoustics, Speech and Signal Processing (ICASSP), pp. 6588-6592. IEEE, 2021.
Muller, T. et al., "Neural Importance Sampling", ACM Transactions on Graphics (ToG), vol. 38, No. 5, 2019, pp. 1-19.
Park, T. et al., "Auto-Tuning Spectral Clustering for Speaker Diarization Using Normalized Maximum Eigengap", IEEE Signal Processing Letters, vol. 27, pp. 381-385, 2019.
Park, T. et al., "Multi-Scale Speaker Diarization with Neural Affinity Score Fusion", In ICASSP 2021—2021 IEEE International Conference on Acoustics, Speech and Signal Processing (ICASSP), pp. 7173-7177. IEEE, 2021.
Peng, K. et al., "Non-Autoagressive Neural Text-to-Speech", International Conference on Machine Learning, pp. 7586-7598, 2020.
Ren, Y. et al., "FastSpeech: Fast, Robust and Controllable Text to Speech", 33rd Conference on Neural Information Processing Systems (NeurIPS 2019), 13 pages.
Sasirekha, D. et al., "Text-to-Speech: A Simple Tutorial", International Journal of Soft Computing and Engineering, vol. 2, Issue 1, 4 pages, Mar. 2012.
Shih, K. et al., "Generative Modeling for Low Dimensional Speech Attributes with Neural Spline Flows", arXiv preprint arXiv:2203.01786 (2022).
Valle, R., "Flowtron: an Autoregressive Flow-based Generative Network for Text-to-Speech Sythesis", arXiv preprint arXiv:2005.05957. May 12, 2020.
Chen, J., et al., "VFlow: More Expressive Generative Flows with Variational Data Augmentation," Proceedings of the 37th International Conference on Machine Learning, PMLR, 2020, vol. 119, pp. 1660-1669. Retrived from the Internet: [https://proceedings.mlr.press/v119/chen20p.html].
Dumoulin, V., et al., "A Learned Representation For Artistic Style," Computer Vision and Pattern Recognition, ICLR, 2017, 26 Pages. Retrived from the Internet: [https://arxiv.org/abs/1610.07629].
Dupont, E., et al., "Augmented Neural ODEs," 33rd Conference on Neural Information Processing Systems, NeurIPS, 2019, vol. 32, pp. 3140-3150.
Durkan, C., et al., "Neural Spline Flows," Advances in Neural Information Processing Systems, 2019, vol. 32, pp. 7511-7522.
Huang, C.W., et al., "Augmented Normalizing Flows: Bridging the Gap Between Generative Flows and Latent Variable Models," Machine Learning, 2022, 27 Pages. Retrived from the Internet: [https://arxiv.org/abs/2002.07101].
Jeong, M., et al., "Diff-TTS: A Denoising Diffusion Model for Text-to-Speech," Department of Electrical and Computer Engineering and INMC, 2021, 5 Pages. Retrived from the Internet: [https://arxiv.org/pdf/2104.01409.pdf].
Kawahara, H., et al., "Nearly Defect-free Fo Trajectory Extraction for Expressive Speech Modifications Based on Straight," In Ninth European Conference on Speech Communication and Technology, 2005, 5 Pages.
Kim, H., et al., "Softflow: Probabilistic Framework for Normalizing Flow on Manifolds," Advances in Neural Information Processing Systems, 2020, 10 Pages.
Kim, J., et al., "Glow-TTS: A Generative Flow for Text-to-speech via Monotonic Alignment Search," Advances in Neural Information Processing Systems, 2020b, 11 Pages.
Kingma, D.P., et al., "Glow: Generative flow with invertible 1×1 Convolutions," Advances in Neural Information Processing Systems, 2018, vol. 31, 10 Pages.
Kong, J., et al., "Hifi-gan: Generative Adversarial Networks for Efficient and High Fidelity Speech Synthesis," Advances in Neural Information Processing Systems, 2020, pp. 1-14.
Kong, J., et al., "Hifi-gan: Generative Adversarial Networks for Efficient and High Fidelity Speech Synthesis," 2022, Retrived from the Internet: [https://github. com/jik876/hifi-gan,].
Mauch, M., et al., "Pyin: A Fundamental Frequency Estimator Using Probabilistic Threshold Distributions," In 2014 IEEE International Conference on Acoustics, Speech and Signal Processing (Icassp), 2014, pp. 659-663.
McCree, A.V., et al., "A Mixed Excitation lpc Vocoder Model for Low Bit Rate Speech Coding," IEEE Transactions on Speech and Audio Processing, 1995, vol. 3(4), pp. 242-250.
Miao, C., et al., "Flow-TTS: A Non-autoregressive Network for Text to Speech Based on Flow," IEEE International Conference on Acoustics, Speech and Signal Processing (ICASSP), 2020, 5 Pages.
Moog, B., "MIDI: Musical Instrument Digital Interface," Journal of the Audio Engineering Society, 1986, vol. 34(5), pp. 394-404.
Nakatani, T., et al., "A Method for Fundamental Frequency Estimation and Voicing Decision: Application to Infant Utterances Recorded in Real Acoustical Environments," Speech Communication, Mar. 2008, vol. 50(3), pp. 203-214.
Ping, W., et al., "Waveflow: A Compact Flow-based Model for Raw Audio," In International Conference on Machine Learning, pp. 7706-7716.
Popov, V., et al., "Grad-TTS: A Diffusion Probabilistic Model for Text-to-Speech," Arxiv Preprint, 2021, 10 Pages.
Ren, Y., et al., "FastSpeech 2: Fast and High-Quality End-to-End Text to Speech," Aug. 8, 2022, 15 Pages. Retrived from the Internet: [https://speechresearch.github.io/fastspeech2/].
Ren, Y., et al., "FastSpeech 2: Fast and High-Quality End-to-End Text to Speech," arXiv:2006.04558v1 [eess.AS] Jun. 8, 2020.
Shih, K.J., et al., "RAD-TTS: Parallel Flowbased Tts With Robust Alignment Learning and Diverse Synthesis," In ICML Workshop on Invertible Neural Networks, Normalizing Flows, and Explicit Likelihood Models, 2021.
Suni, et al., Wavelets for Intonation Modeling in Hmm Speech Synthesis, ISCA, 2013, 7 Pages.
Valle, R., et al., "Flowtron: An Autoregressive Flow-based Generative Network for Text-to-speech Synthesis," In International Conference on Learning Representations, 2020b.
Valle, R., et al., "Mellotron: Multispeaker Expressive Voice Synthesis by Conditioning on Rhythm, Pitch and Global Style Tokens," In ICASSP 2020-2020 Ieee International Conference on Acoustics, Speech and Signal Processing, 2020a, pp. 6189-6193.
Doty C., et al., "What Is Speaker Diarization," Deepgram, Aug. 2022, 9 Pages Retrieved from internet URL: https://deepgram.com/learn/what-is-speaker-diarization.
Ito, K., et al., "The LJ Speech Dataset," BibSonomy, 2017. Retrived from the Internet: [https://keithito.com/LJ-Speech-Dataset/].
Park T.J., et al., "Multi-Scale Speaker Diarization With Neural Affinity Score Fusion." IEEE, May 2021, pp. 7173-7177 Retrieved from Internet URL: https://ieeexplore.ieee.org/stamp/stamp.jsptp=&arnumber=9414578.

(56) References Cited

OTHER PUBLICATIONS

Wang, Q., et al., "Speaker Diarization With LSTM," ArXiv, Jan. 2022, 5 Pages Retrieved from internet URL: https://arxiv.org/pdf/1710.10468.

Zhang Y., et al., "Audio segmentation based on multi-scale audio classification." IEEE, Aug. 2004, vol. 4, pp. 349-352 Retrieved from Internet URL: https://ieeexplore.ieee.org/stamp/stamp.jsp?tp=&arnumber=1326835&tag=1.

\* cited by examiner

SPEAKER IDENTIFICATION, VERIFICATION, AND DIARIZATION USING NEURAL NETWORKS FOR CONVERSATIONAL AI SYSTEMS AND APPLICATIONS

TECHNICAL FIELD

At least one embodiment pertains to processing resources used to perform and facilitate speaker identification, verification, and/or diarization. For example, at least one embodiment pertains to neural networks that allow for efficient automated association of speech utterances with speakers that the utterances correspond to.

BACKGROUND

Speaker identification involves associating a spoken utterance with other utterances (or some representation of those utterances) stored in a database of speakers, identifying a specific speaker who produced the spoken utterance, and/or determining that the spoken utterance was produced by a new speaker not represented in the database. Speaker verification involves determining whether two or more utterances are spoken by the same speaker or different speakers, regardless of whether the speech processing system has encountered these speakers previously. Speaker diarization involves partitioning unstructured speech episodes involving multiple speakers (e.g., a conversation, a meeting, a public event, etc.) into time-stamped utterances produced by various specific speakers (known or unknown). Speaker diarization can be performed in conjunction with speaker verification or identification, e.g., when the speakers participating in a speech episode are represented in the database of speakers. As another example, speaker diarization may be performed independently from speaker verification or identification, e.g., when one or more of the speakers cannot be recognized. Modern speaker identification, verification, and/or diarization systems often deploy trained neural network models.

DETAILED DESCRIPTION

Figure 1:
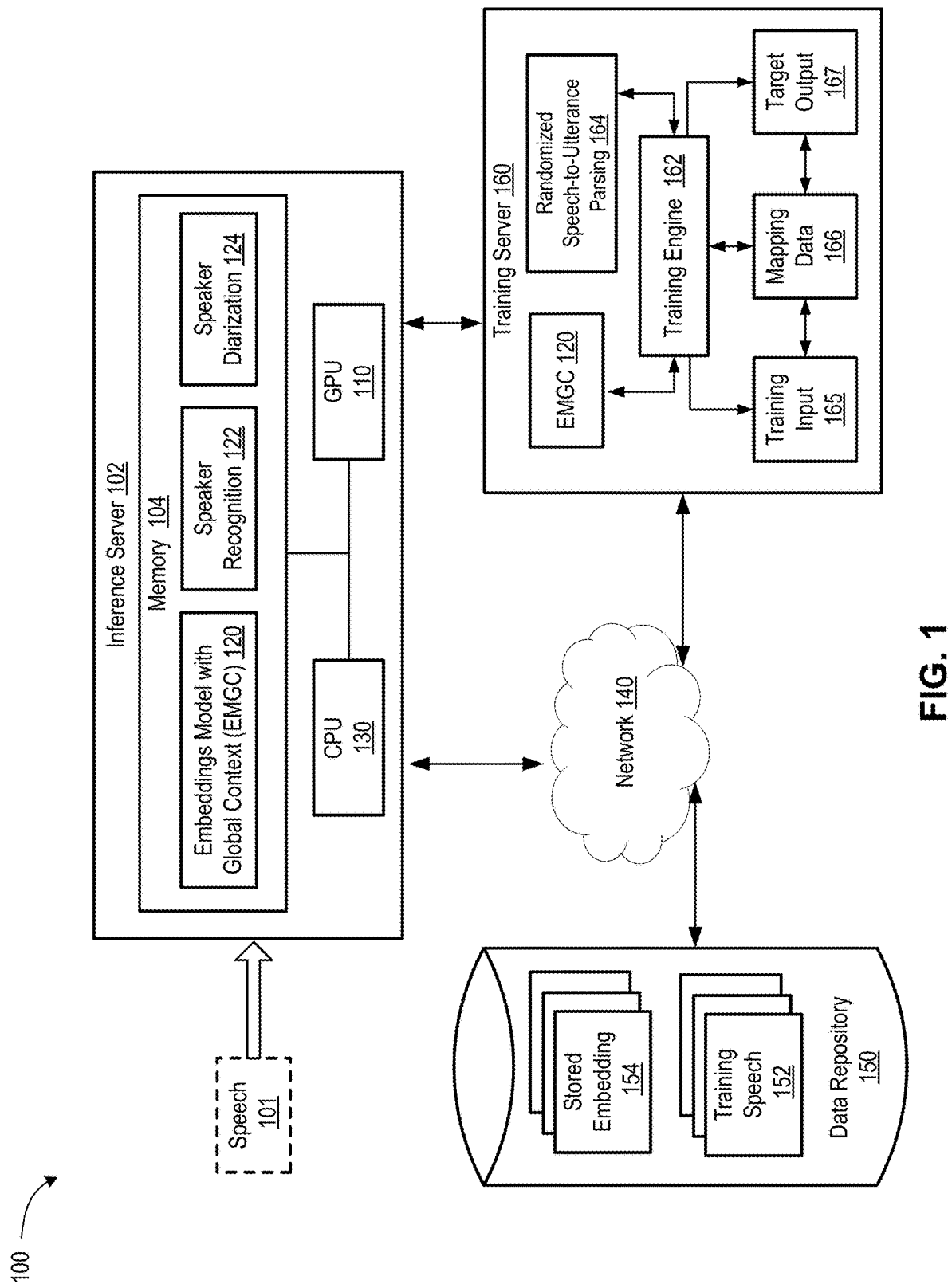
FIG. 1 is a block diagram of an example computer system that uses context-aware neural networks for efficient speaker identification, verification, and/or diarization, in accordance with at least some embodiments.

Deep neural network models may be trained to process speech utterances (or portions thereof) and to output, e.g., speaker embeddings, that can be used as digital fingerprints that identify a speaker. A speaker embedding may be viewed as a vector in a special embeddings space. A well-designed and well-trained model should generate embeddings for different utterances produced (spoken) by the same person that differ significantly less (in the embeddings space) than utterances produced by different people. Under such conditions, any utterance of a non-trivial duration—e.g., of a duration that is sufficient to capture voice features of a person—may be efficiently used for speaker identification, verification, and/or speech attribution (e.g., diarization). An input into a model may include a speech representation—such as a spectrogram, or mel-spectrogram—of an utterance that is obtained at different temporal portions (frames, such as every ten, fifteen, thirty, etc. milliseconds) of the utterance. Some models are trained to generate embeddings that allow for one or more of speaker identification, speaker verification, or speaker diarization, and such models may include a large number of neurons with, e.g., hundreds of thousands (or more) of parameters (e.g., weights and biases).

Aspects and embodiments of the present disclosure address these and other technological challenges by providing for techniques and systems that enable neural networks of significantly reduced sizes—as compared to conventional systems—while being capable of generating speaker embeddings that may be used for multiple tasks (e.g., identification, verification, and/or diarization). This substantial advance in speech technology is achieved using a neural network architecture that combines perception of local (e.g., in the temporal domain of frames) speech features with the awareness of the global context of the speech across a wide range of frames of a speech utterance. More specifically, the disclosed neural networks may include one or more blocks of neurons arranged in parallel branches that process utterances represented by C×T input data values—where C is the number of frequency bands (channels) of the spectrogram (or other input representation) that represents the utterance, and T is the number of frames in the utterance. The parallel branches may jointly account for both the local and the global temporal context of the utterance that is being processed.

In some embodiments, a first branch may include convolutions that are performed across different frames and across different channels. Convolutions may change the number of channels C→C' and the number of temporal data units T→T'. An output of the convolutions may be used as an input into a squeeze-and-excitation (SE) group of neural layers. The SE group may first squeeze (combine) the input along the temporal dimension C'×T' →C'×1 to obtain a global squeezed C'×1 vector, perform one or more transformations of the global vector (e.g., using one or more fully connected neuron layers and activation functions), and then expand the transformed global vector back to the original dimensions, C'×1→C'×T'. The expanded global vector may be combined (e.g., using element-by-element multiplications) with the original C'×T' input into the SE group. This operation yields the output of the SE group that combines the local context of the utterance with its global context across the temporal domain. The second branch may include convolutions that are performed across different channels (and for fixed frames). The resulting C'×T output of the second branch may be combined (e.g., using average pooling) with the output of the first branch. The combined output may be further processed using attention pooling layers, linear layers, fully-connected layer, and/or so on, to generate a speaker embedding E representative of the utterance.

In some embodiments, a neural network may be trained to perform speaker identification and subsequently deployed for speaker verification and/or diarization. For example, training speech segments may be annotated with ground truth that includes correct or accurate speaker identities for the respective training speech segments. A loss function (e.g., an angular softmax margin loss function) may characterize a mismatch between a predicted speaker and a ground truth speaker of the respective training speech segment. In training, various parameters (e.g., weights and biases) of the neural network may be modified to decrease the loss function.

In some embodiments, a neural network may be trained to perform speaker verification and/or diarization directly. For example, during training, a neural network may generate a first training speaker embedding $E_1$ representative of a first training speech segment and a second training speaker embedding $E_2$ representative of a second training speech segment. Parameters of the neural network may be modified to decrease a suitably chosen loss function (e.g., a cosine similarity loss $\cos(E_1, E_2)$), if the first training speaker embedding $E_1$ and the second training speaker embedding $E_2$ are produced by the same speaker. Conversely, parameters of the neural network may be modified to increase the loss function, if the first speaker is different from the second speaker. Training may include multiple pairs or batches of utterances. According to some embodiments of the present disclosure, efficient training may be facilitated by segmenting training speech episodes into segments of predetermined durations, e.g., 1 second, 1.5 seconds, 2 seconds, 3 seconds, etc. In some embodiments, segmenting training speech episodes may be performed randomly. Processing of segmented training speech episodes teaches a neural network model to recognize speaker's voice features without relying on semantic context or a cadence of the speaker's speech. Additionally, segmentation of training speech episodes teaches the model to recognize a speaker's voice features not only in the context of speaker identification, but also in the context of speaker verification and/or speaker diarization.

The advantages of the disclosed techniques include but are not limited to neural network architectures that are significantly more compact than existing models used for speaker verification or diarization. Moreover, the disclosed neural network models may be trained for speaker identification and then also used, at inference, for speaker verification and/or diarization, without requiring specific training focused on verification and/or diarization.

System Architecture

FIG. 1 is a block diagram of an example computer system 100 that uses context-aware neural networks for efficient speaker identification, verification, and/or diarization, in accordance with at least some embodiments. As depicted in FIG. 1, a computing system 100 may include an inference server 102, a data repository 150, and a training server 160 connected to a network 140. Network 140 may be a public network (e.g., the Internet), a private network (e.g., a local area network (LAN), or wide area network (WAN)), a wireless network, a personal area network (PAN), a combination thereof, and/or another network type.

Inference server 102 may include a desktop computer, a laptop computer, a smartphone, a tablet computer, a server, a wearable device, a VR/AR/MR headset or heads up display, a digital avatar or chatbot kiosk, an in-vehicle infotainment computing device, and/or any suitable computing device capable of performing the techniques described herein. Inference server 102 may be configured to receive speech 101 that may be associated with any speech episode involving one or more speakers. Speech episodes may include a public or private conversation, a business meeting, a public or a private presentation, an artistic event, a debate, an interaction between a digital agent (e.g., chat bot, digital avatar, etc.) and a user(s), an in-vehicle communication (e.g., between two or more occupants, between an occupant(s) and a chat bot, avatar, or digital assistant of the vehicle), and/or the like. Speech 101 may be recorded using one or more devices connected to inference server 102, retrieved from memory 104 of inference server 102, and/or received over any local or network connection (e.g., via network 140) from an external computing device. Speech 101 may be in any suitable format, e.g., WAV, AIFF, MP3, AAC, WMA, or any other compressed or uncompressed format. In some embodiments, speech 101 may be stored (e.g., together with other data, such as metadata) in data repository 150. Additionally, data repository 150 may store training speech 152 for training one or more models capable of speaker identification, speaker verification, and/or speaker diarization, according to some embodiments disclosed herein. Data repository 150 may be accessed by inference server 102 directly or (as shown in FIG. 1) via network 140.

Data repository 150 may include a persistent storage capable of storing audio files as well as metadata for the stored audio files. Data repository 150 may be hosted by one or more storage devices, such as main memory, magnetic or optical storage disks, tapes, or hard drives, network-attached storage (NAS), storage area network (SAN), and so forth. Although depicted as separate from inference server 102, in at least some embodiments, data repository 150 may be a part of inference server 102. In at least some embodiments, data repository 150 may be a network-attached file server, while in other embodiments data repository 150 may be some other type of persistent storage such as an object-oriented database, a relational database, and so forth, that may be hosted by a server machine or one or more different machines coupled to the inference server 102 via network 140.

Inference server 102 may include a memory 104 (e.g., one or more memory devices or units) communicatively coupled with one or more processing devices, such as one or more graphics processing units (GPU) 110 and/or one or more central processing units (CPU) 130. Memory 104 may store one or more models, such as an embeddings model with global context (EMGC) 120 trained to process speech 101. EMGC 120 may be executed by GPU 110 and/or CPU 130. In some embodiments, EMGC 120 may use speech 101 (or training speech 152) as an input. Speech 101 may be segmented into utterances of a fixed duration $\tau$ or utterances of randomly selected durations, e.g., $\tau_1, \tau_2 \ldots \tau_M$. Each utterance may be processed by EMGC 120 to generate a speaker embedding representative of a speaker who produced the respective utterance.

The generated speaker embeddings may be used by speaker recognition module 122 and/or speaker diarization module 124. In some embodiments, speaker recognition module 122 may perform speaker identification and/or speaker verification. For speaker identification, speaker recognition module 122 may use a suitably chosen loss function to classify a generated speaker embedding E among a plurality of classes corresponding to a set of known speakers and select a most likely match. For speaker verification, speaker recognition module 122 may determine whether two or more utterances described by respective speaker embeddings $E_1, E_2, \ldots$, etc., are produced by the same speaker (though not necessarily a known speaker in a database) or different speakers. More specifically, speaker recognition module 122 may compute a similarity, e.g., cosine similarity of two (or more) embeddings, e.g., $\cos(E_1, E_2)$, and determine whether the computed similarity exceeds a certain empirically determined threshold T: $\cos(E_1, E_2) > T$. The similarity above the threshold may indicate that the two (or more) utterances are produced by the same person while the similarity below the threshold may indicate that the utterances are spoken by different people.

Speaker diarization module 124 may group (cluster) a set of speaker embeddings $\{E_j\}$ obtained by processing (using EMGC 120) of multiple segments (e.g., frames) of a given speech episode among a plurality of clusters corresponding to different speakers. Similar to speaker verification, diarization may be performed based on similarity (e.g., cosine similarity) of various pairs of embeddings $\cos(E_j, E_k)$ (e.g., $N(N-1)/2$ different i, j pairs of N embeddings). Speaker diarization module 124 may determine a number (apriori unknown) of different clusters (speakers) and associate individual spoken utterances with a particular cluster (speaker). In some embodiments, to improve speaker diarization, speech segments may be segmented with some overlap, e.g., segment 1 may capture speech produced between 0 sec and 2 sec time stamps, segment 2 may capture speech produced between 1 sec and 3 sec time stamps, segment 3 may capture speech produced between 2 sec and 4 sec time stamps, and so on. In some embodiments, segments may be overlapping and/or of randomly selected durations.

Training speech 152 may be stored in a data repository in a raw audio format, e.g., in the form of spectrograms, or in any other suitable representation characterizing speech (e.g., of a particular person). For example, a spectrogram of training speech 152 may be obtained by recording air pressure caused by the speech as a function of time and computing a short-time Fourier transform for overlapping time intervals (frames) of a set duration. This maps the audio signal from the time domain to the frequency domain and generates a spectrogram characterizing the spectral content of training speech 152. The amplitude of the audio signal may be represented on a logarithmic (decibel) scale. In some embodiments, the obtained spectrograms may be further converted into mel-spectrograms, by transforming frequency f into a non-linear mel domain, $f \to m = a \ln(1 + f/b)$, to take into account the ability of a human ear to distinguish better between equally spaced frequencies (tones) at the lower end of the frequencies of the audible spectrum than at its higher end; for example, a=1607 and b=700 Hz. Throughout this disclosure, the term "speech" spectrogram should be understood to include spectrograms, e.g., mel-spectrograms, where applicable.

In at least one embodiment, each or some of EMGC(s) 120 may be implemented as deep learning neural networks having multiple levels of linear or non-linear operations. For example, each or some of EMGC(s) 120 may include convolutional neural layers, recurrent neural layers, fully connected neural networks, and/or so on. In at least one embodiment, one or more of EMGC(s) 120 may include multiple neurons, where individual neurons may receive its input from other neurons and/or from an external source and may produce an output by applying an activation function to the sum of (trainable) weighted inputs and a bias values. In at least one embodiment, one or more of EMGC(s) 120 may include multiple neurons arranged in layers, including an input layer, one or more hidden layers, and/or an output layer. Neurons from adjacent layers may be connected by weighted edges. In some embodiments, training server 160 may train a number of different EMGC 120, which may be models that differ by a number of neurons, number of neuron layers, specific neural architecture, and/or the like.

Training speech 154 may be used by a training server 160 to identify parameters (e.g., neural weights, biases, parameters of activation functions, etc.) of EMGC 120 that aim to maximize success of speaker identification, verification, and/or diarization. Training server 160 may be hosted by a desktop computer, a laptop computer, a smartphone, a tablet computer, a server, and/or any suitable computing device capable of performing the techniques described herein. In some embodiments, training of EMGC 120 may be supervised, e.g., using human-annotations of training speech 152 with speaker identities as ground truth, unsupervised, and/or semi-supervised.

Training server 160 may deploy a randomized speech-to-utterance parsing module 164 to perform segmentation of specific training speech episodes into utterances of randomly selected durations, e.g., $\tau_1, \tau_2 \ldots \tau_M$. For example, speech-to-utterance parsing module 164 may define durations $\tau_1=1$ sec, $\tau_2=1.5$ sec, $\tau_3=2$ sec, $\tau_4=3$ sec, and so on (or any other set of durations $\tau_1 \ldots \tau_M$). A speech episode, e.g., a 20-second episode, may be segmented by randomly selecting a first utterance duration, e.g., $\tau_3$, followed by another randomly selected second utterance duration, e.g., $\tau_1$, and so on, until the entire episode is segmented into random-duration utterances. In some embodiments, the random-duration utterances may be partially overlapping, e.g., the second utterance may start in the middle of the first utterance (e.g., at time $\tau_3/2$ or some other fraction of the first utterance), and so forth.

Individual training utterances may be used by training engine 162 as training input 165 to train one or more EMGC(s) 120 that generate speaker embeddings. Training engine 162 may also generate mapping data 166 (e.g., metadata) that associates training input(s) 165 with correct target output(s) 167. During training of EMGC(s) 120, training engine 162 may identify patterns in training input(s) 165 based on desired target output(s) 167 and train EMGC (s) 120 to generate speaker embeddings that accurately distinguish different speakers. Predictive utility of the identified patterns may be subsequently verified using additional training input/target output associations and then used, during the inference stage, using trained EMGC(s) 120, in future processing of input speech. In at least one embodiment, training server 160 and inference server 102 may be implemented on a single computing device. Training server 160 and/or inference server 102 may be (and/or include) a rackmount server, a router computer, a personal computer, a laptop computer, a tablet computer, a desktop computer, a media center, or any combination thereof.

Initially, edge weights and biases may be assigned some starting (e.g., random) values. For every training input 165, training engine 162 may cause one or more of EMGC(s) 120 to generate output(s). Training engine 162 may then compare observed output(s) with the desired target output(s) 167. The resulting error or mismatch, e.g., the difference between the desired target output(s) 167 and the actual output(s) of the neural networks, may be back-propagated through the respective neural networks, and the weights and biases in the neural networks may be adjusted to make the actual outputs closer to the target (ground truth) outputs. This adjustment may be repeated until the output error for a given training input 165 satisfies a predetermined condition (e.g., falls below a predetermined value). Subsequently, a different training input 165 may be selected, a new output generated, and a new series of adjustments implemented, until the respective neural networks are trained to a target degree of accuracy (e.g., until the neural network(s) converge).

In at least some embodiments, EMGC 120 may be trained for speaker identification, e.g., using a database of known speakers, and then applied, at inference time, for speaker verification and/or speaker diarization of speech utterances produced by new speakers, as described in more detail below in conjunction with FIG. 3. More specifically, embeddings generated by EMGC 120 during training may be evaluated using a suitably chosen loss function that classifies the generated embeddings among a plurality of training classes (e.g., known speakers). In at least some embodiments, the loss function-based evaluation across multiple classes is performed during training but not during inference. During inference, speaker verification and speaker diarization may be performed using cosine similarity of various speech embeddings. In some embodiments, for efficient training, dropout techniques may be used, with outputs of at least some neurons removed (e.g., replaced with zero outputs). This forces the remaining neurons to learn how to perform classification tasks more efficiently and generate more accurate (representative) embeddings. During training, different neurons (e.g., randomly chosen neurons) may be dropped during processing of different batches of training data, so that all neurons learn to perform tasks more accurately and efficiently.

Figure 2:
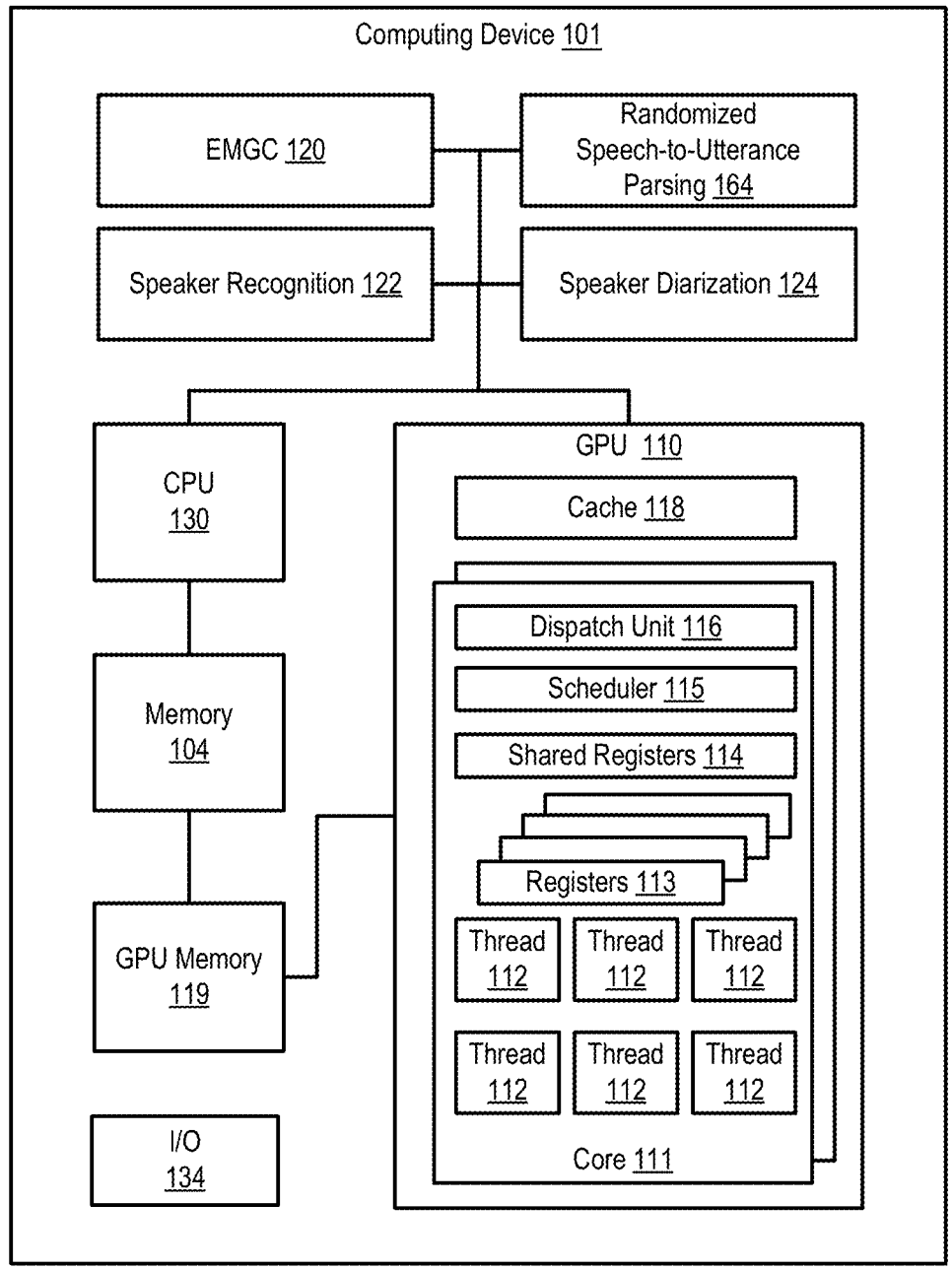
FIG. 2 illustrates an example computing device which may train or deploy context-aware neural networks for efficient speaker identification, verification, and/or diarization, according to at least one embodiment.

FIG. 2 illustrates an example computing device 101 which may train or deploy context-aware neural networks for efficient speaker identification, verification, and/or diarization, according to at least one embodiment. In at least one embodiment, computing device 101 may be a part of inference server 102. In at least one embodiment, computing device 101 may be a part of training server 160. In at least one embodiment, EMGC 120, speaker recognition module 122 (which may perform both speaker identification and speaker verification), speaker diarization module 124, and/or randomized speech-to-utterance parsing 164 may be executed using one or more GPUs 110 (and/or other parallel processing units (PPUs) or accelerators, such as a deep learning accelerator, a data processing unit (DPU), etc.) and one or more CPUs 130. In at least one embodiment, a GPU 110 includes multiple cores 111, each core being capable of executing multiple threads 112. Each core may run multiple threads 112 concurrently (e.g., in parallel). In at least one embodiment, threads 112 may have access to registers 113. Registers 113 may be thread-specific registers with access to a register restricted to a respective thread. Additionally, shared registers 114 may be accessed by one or more (e.g., all) threads of the core. In at least one embodiment, each core 111 may include a scheduler 115 to distribute computational tasks and processes among different threads 112 of core 111. A dispatch unit 116 may implement scheduled tasks on appropriate threads using correct private registers 113 and shared registers 114. Computing device 101 may include input/output component(s) 134 to facilitate exchange of information with one or more users or developers.

In at least one embodiment, GPU 110 may have a (high-speed) cache 118, access to which may be shared by multiple cores 111. Furthermore, computing device 101 may include a GPU memory 119 where GPU 110 may store intermediate and/or final results (outputs) of various computations performed by GPU 110. After completion of a particular task, GPU 110 (or CPU 130) may move the output to (main) memory 104. In at least one embodiment, CPU 130 may execute processes that involve serial computational tasks whereas GPU 110 may execute tasks (such as multiplication of inputs of a neural node by weights and adding biases) that are amenable to parallel processing. In at least one embodiment, EMGC 120 may determine which processes are to be executed on GPU 110 and which processes are to be executed on CPU 130. In other embodiments, CPU 130 may determine which processes are to be executed on GPU 110 and which processes are to be executed on CPU 130.

Training and Deployment of Context-Aware Neural Networks

Figure 3:
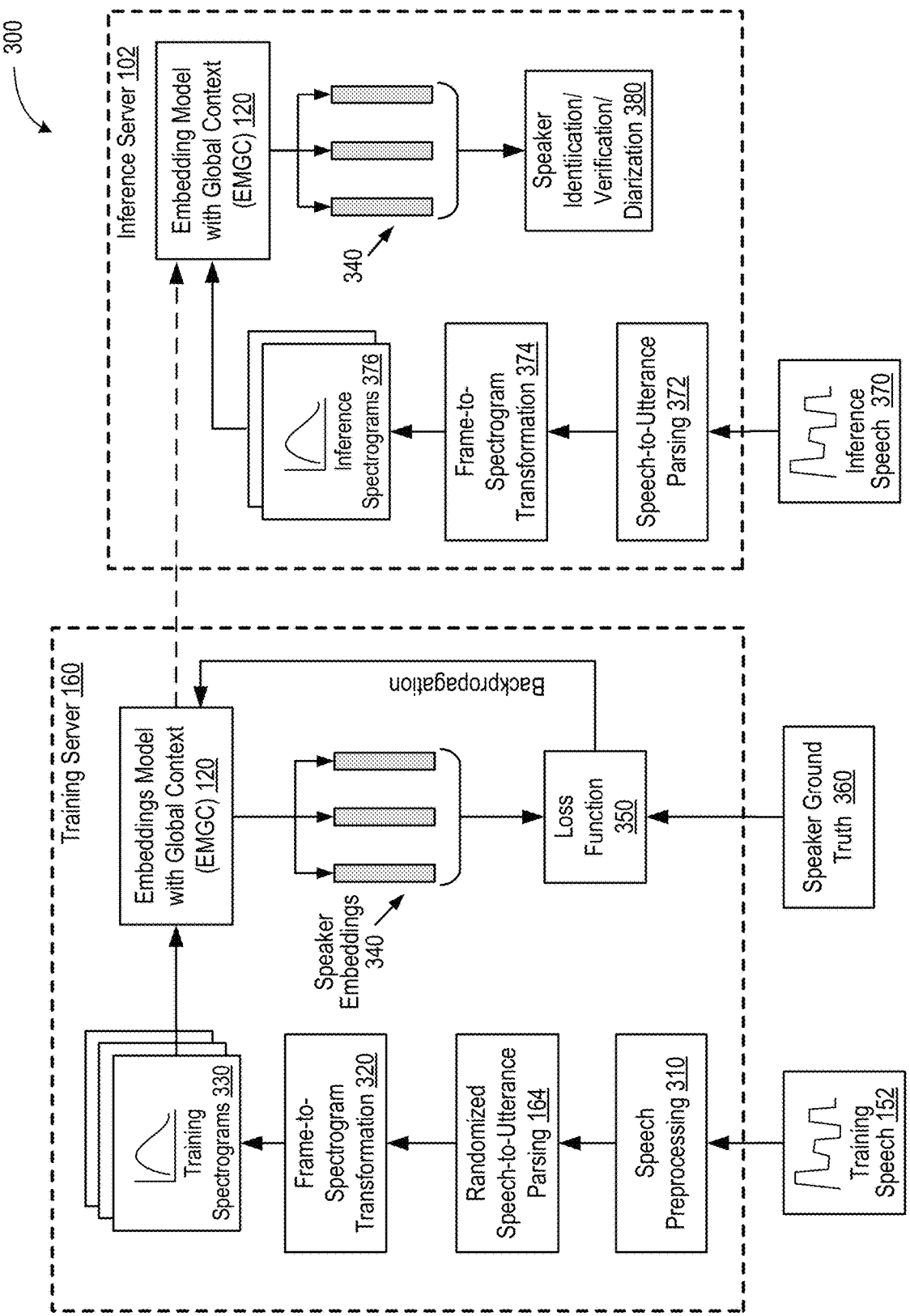
FIG. 3 illustrates an example data flow corresponding to training and deployment of context-aware neural networks that, e.g., generate speaker embeddings for efficient speaker identification, verification, and/or diarization, according to at least one embodiment.

FIG. 3 illustrates an example data flow 300 during training and deployment of context-aware neural networks that generate speaker embeddings for efficient speaker identification, verification, and/or diarization, according to at least one embodiment. In at least one embodiment, data flow 300 may be implemented using training server 160 and/or inference server 102, which may be located on a single computing device or on different computing devices. Various blocks in FIG. 3 denoted with the same numerals as the respective blocks of FIG. 1 and/or FIG. 2 may implement the same (or a similar) functionality.

As illustrated in FIG. 3, training speech 152 may be used as an input into training server 160. Training speech 152 may be generated, e.g., spoken, by a single speaker or multiple speakers. Training speech 152 may include a single speech episode or multiple speech episodes. Training speech 152 may undergo speech preprocessing 310, which may include audio filtering, denoising, amplification, and/or any other suitable enhancement. Speech preprocessing 310 may further include removal of portions of training speech 152 that do not have a speech content. For example, speech preprocessing 310 may process energy e (t) of training speech 152 as a function of time and identify regions of training speech that have energy less than a certain threshold (e.g., an empirically determined noise threshold). Such identified regions may be removed (trimmed) from training speech 152 during speech preprocessing 310.

In some embodiments, training speech 152 may also undergo randomized speech-to-utterance parsing 164, e.g., as described herein at least with respect to FIG. 1. The utterances output by speech-to-utterance parsing 164 may have durations equal to one of a set of durations $\tau_1, \tau_2 \ldots \tau_M$. As a result, each speech episode of training speech 152 may be segmented into multiple utterances of various durations. Each utterance may undergo a suitable frame-to-spectrogram transformation 320. For example, a spectrogram of training speech 152 may be obtained or generated by performing the discrete Fourier transform of acoustic energy e(t) (or air pressure p(t)) associated with a specific utterance. The obtained training spectrograms 330 e($f_j$) may be defined for a number of bands $f_1, f_2 \ldots f_C$, for example, for C=80 bands or C=128 bands, or any other number of bands. In some embodiments, the bands may be mel-bands and training spectrograms 330 may be mel-spectrograms. Training spectrograms 330 may be obtained for each of T frames of the utterance. Frames may be overlapping and may have a duration of 15 msec, 20 msec, 30 msec, and/or any other durations.

Training spectrograms 330 may be used as a B×C×T input into an EMGC 120 that is being trained, where B is the batch dimension corresponding to the number of segmented utterances in a particular speech episode (or a combination of speech episodes). The output of EMGC 120 may be a set of B speaker embeddings 340, each embedding representing a particular utterance of the batch. A speaker embedding 340 may be a d-dimensional vector (e.g., a 192-bit vector, a 256-bit vector, or a vector of any other length). A loss function 350 may be used to evaluate speaker embeddings 340 in view of speaker ground truth 360. In some embodiments, speaker ground truth 360 may be a set of speaker embeddings generated using a different (teacher model). In some embodiments, speaker ground truth 360 may include stored mappings of various speech utterances to identities of speakers who produced those utterances. Loss function 350 may be (or include) a focal loss function, a negative log likelihood loss function, a mean square loss function, a cross-entropy loss function, and/or any other suitable loss function. In some embodiments, loss function 350 may be a softmax (SM) loss function $$L_{SM} = -\frac{1}{N}\sum_{i=1}^{N}\log\frac{e^{f_{c_i}}}{\sum_{j=1}^{n}e^{f_{j(i)}}},$$

where N is the number of training utterances enumerated with index i=1 ... N; n is the number of different classes (e.g., the number of speakers in the training database of speakers) enumerated with index j=1 ... n; $f_{j(i)}$ are logits characterizing the likelihood that training utterance i is associated with class j. The logit $f_{j(i)}$ may be determined by the d-dimensional speaker embedding vector $E_i$ generated by EMGC 120 for training utterance j, $$f_{j(i)} = W_j^T \cdot E_i + b_j$$

computed as the dot product of j-th column $W_j$ of d×n dimensional matrix of weights of the last (e.g., fully-connected) neuron layer of EMGC 120 with the speaker embedding $E_i$, additionally shifted by j-th element of n-dimensional bias vector b. The logit $f_{c_i}$ is the logit computed in the similar way to the actual (known from speaker ground truth 360) class $c_i$ of the training utterance i ($f_{c_i} = W_{c_i}^T \cdot E_i + c_i$).

In some embodiments, the columns of weights $W_j$ may be normalized to unity ($\|W_j\|=1$) and speaker embedding $E_i$ may be normalized to a fixed scale s ($\|E_i\|=s$) so that the angle $\theta_{j,i}$ between j-th column of weights and i-th speaker embedding parameterizes the dot-product $W_j^T \cdot E_i = s \cos \theta_{j,i}$. In some embodiments, bias vector may be set to zero, b=0. Additionally, a more stringent condition on the correct class of an utterance may be imposed by replacing the angle corresponding to the correct class, $\theta_{c_i,i} \to m\theta_{c_i,i}$ with m>1, so that the loss function becomes a multiplicative angular margin (MAM) loss function, $$L_{MAM} = -\frac{1}{N}\sum_{i=1}^{N}\log\frac{e^{s\cos(m\theta_{c_i,i})}}{e^{s\cos(m\theta_{c_i,i})} + \sum_{j=1,j\neq c_i}^{n}e^{s\cos\theta_{j,i}}}.$$

In some embodiments, a multiplicative angular margin (AAM) loss function may be used, $$L_{AAM} = -\frac{1}{N}\sum_{i=1}^{N}\log\frac{e^{s\cos(m\theta_{c_i,i})}}{e^{s\cos(m\theta_{c_i,i})} + \sum_{j=1,j\neq c_i}^{n}e^{s\cos\theta_{j,i}}}.$$

As described above, loss function 350 may include one of the loss functions $L_{SM}, L_{MAM}, L_{AAM}$, or some other suitable loss function. During training of EMGC 120, loss function 350 may be used to identify errors in speaker embeddings 340 output by EMGC 120. Training may include using gradient computation and backpropagation to select parameters of EMGC 120, such as weights and biases of various layers of neurons of EMGC 120 (including weights $W_j$ of the final layer of EMGC 120), that maximize correct classifications of various utterances of training speech 152.

A resulting benefit of the architecture of the EMGC 120 and the training thereof is that the EMGC 120 may be trained for speaker identification (e.g., using loss function 350 and speaker ground truth 360), and then may be efficiently deployed, during inference, not only for speaker identification (as trained), but also for speaker verification and/or speaker diarization. Trained EMGC 120 may be provided to inference server 102 that may use the trained EMGC 120 for inferences on new data, e.g., inference speech 370. Inference speech 370 may be generated by a single speaker or by multiple speakers. Inference speech 370 may include a single speech episode or multiple speech episodes. Inference speech 370 may undergo speech preprocessing (not shown in FIG. 3), which may be performed similarly to speech preprocessing 310 on training server 160.

In some embodiments, inference speech 370 may further undergo randomized speech-to-utterance parsing 372. In some embodiments, speech-to-utterance parsing 372 may segment inference speech 370 into equal-duration utterances of 1 sec, 1.5 sec, 2 sec, 3 sec, etc., or segments of any other duration. In some embodiments, speech-to-utterance parsing 372 may segment inference speech 370 into utterances of a set of durations $\tau_1, \tau_2 \ldots \tau_M$ randomly selected, e.g., as described at least in conjunction with randomized speech-to-utterance parsing 164. In some embodiments, one or more of the segmented utterances may overlap with at least one other utterance. In some embodiments, inference speech 370 may be segmented into utterances of an equal duration (which may be overlapping or non-overlapping). Each utterance may undergo a frame-to-spectrogram transformation 374 that represents the utterance via inference spectrograms 376. Frame-to-spectrogram transformation 374 may be performed similarly to frame-to-spectrogram transformation 320 on training server 160. For example, each inference utterance may be split into (e.g., overlapping) time frames (e.g., 25 msec time frames shifted over 10 msec windows) with each frame undergoing a discrete Fourier transformation (e.g., 512-point Fast Fourier transformation with a Hann window) to determine spectral content of the respective frame among a number of bands (e.g., mel-bands) $f_1$, $f_2 \ldots f_C$. Inference spectrograms 376 may be arranged into a B×C×T input with batch dimension B being the number of segmented utterances in inference speech 370, and T being the number of frames in the segmented utterances. Trained EMGC 120 may generate a set of B speaker embeddings 340, each embedding representing a particular utterance in the batch. As part of block 380, speaker embeddings 340 may be used for one or more of speaker identification, speaker verification, and/or speaker diarization. In particular, speaker embeddings 340 may be used for speaker identification, e.g., determining that a speaker (or multiple speakers) from a database of known speakers is associated with inference speech 370 (or portions of inference speech 370). In addition (or alternatively), speaker embeddings 340 may be used for speaker verification, e.g., determining whether two or more utterances in inference speech 370 are spoken by the same speaker or by different speakers. In addition (or alternatively), speaker embeddings 340 may be used for speaker diarization, e.g., partitioning inference speech 370 into (time-stamped) utterances produced by and attributed to various speakers (e.g., to known speakers, by name, and/or to unknown speakers, using an identifier—e.g., Speaker 1, Speaker 2, etc.). In some embodiments, operations of block 380 may be performed by speaker recognition module 122 and/or speaker diarization module 124 of FIG. 1.

Figure 4A:
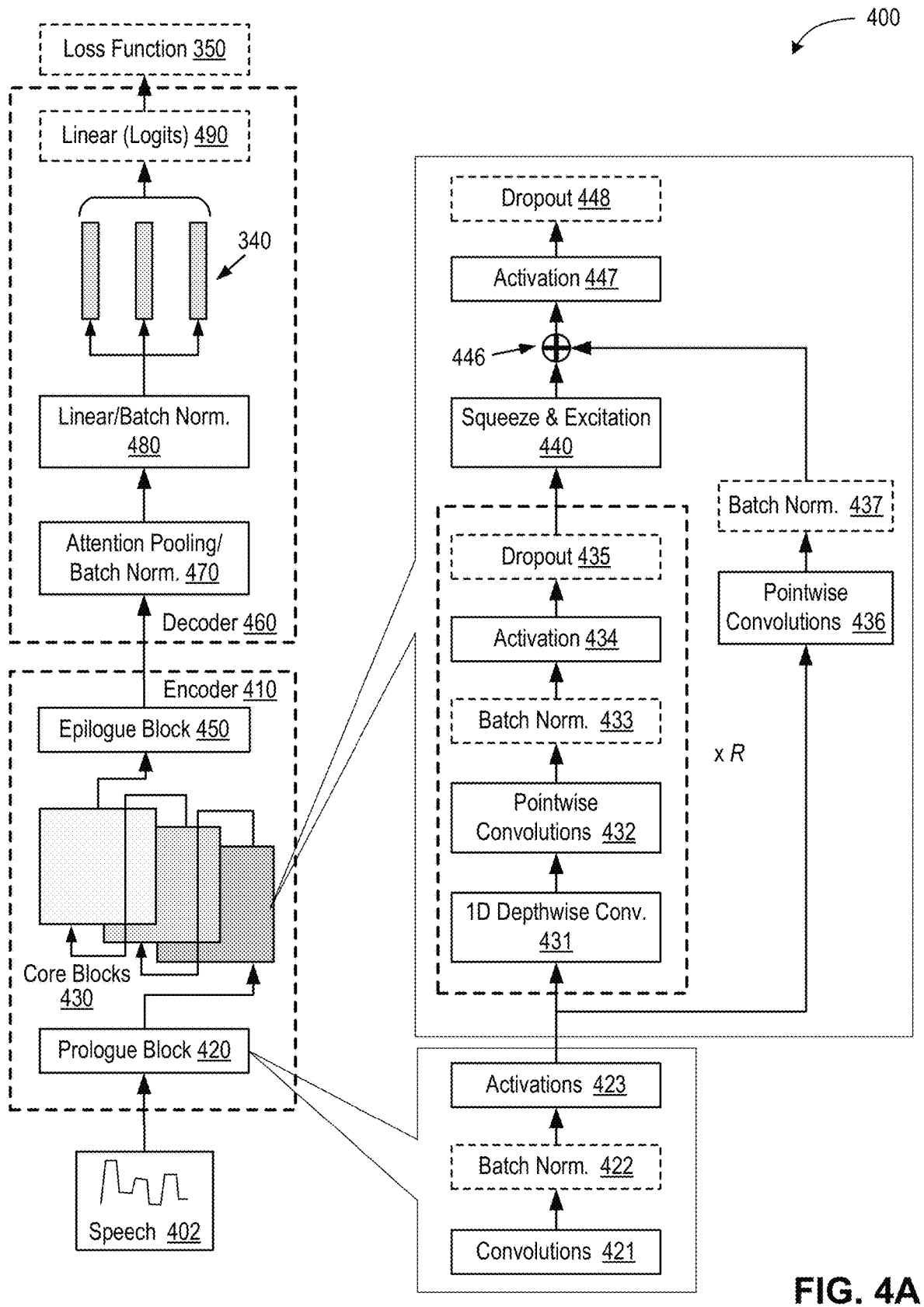
FIG. 4A illustrates an example architecture of a context-aware neural network that generates speaker embeddings for efficient speaker identification, verification, and/or diarization, according to at least one embodiment.

FIG. 4A illustrates an example architecture of a context-aware neural network 400 that generates speaker embeddings for efficient speaker identification, verification, and diarization, according to at least one embodiment. Neural network 400 may be EMGC 120 of FIGS. 1-3 and may be configured to process speech 402, which may be training speech 152, inference speech 370, and/or some other speech. Neural network 400 may include an encoder stage 410 and a decoder stage 460. Encoder stage 410 may include a number of blocks configured to combine local (temporal) context of speech features with global context of each utterance of speech 402. As illustrated in FIG. 4, encoder stage 410 may include a prologue block 420, one or more core blocks 430, and an epilogue block 450. Individual blocks of blocks 420-450 may include one or more convolutions. For example, as illustrated with the bottom callout portion in FIG. 3A, prologue block 420 may include a layer of convolutions 421, a batch normalization layer 422, and/or a layer of activations 423. In some embodiments, layer of convolutions 421 may deploy filters (kernels) of a suitable size, e.g., size 3, 5, etc., which may be used for depthwise convolutions, pointwise convolution, or a combination of depthwise and pointwise convolutions. In at least some embodiments, epilogue block 450 may have a similar composition to the prologue block 420, with the same or a different filter size (e.g., 1, 3, etc.).

Figure 4B:
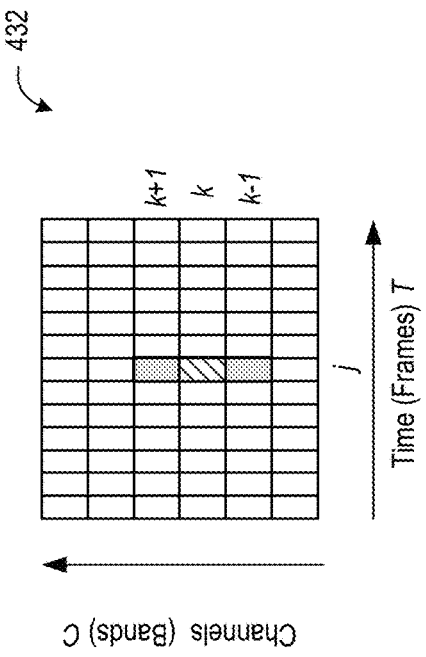
FIG. 4B illustrates application of a depthwise convolutional filter, according to at least one embodiment.
Figure 4C:
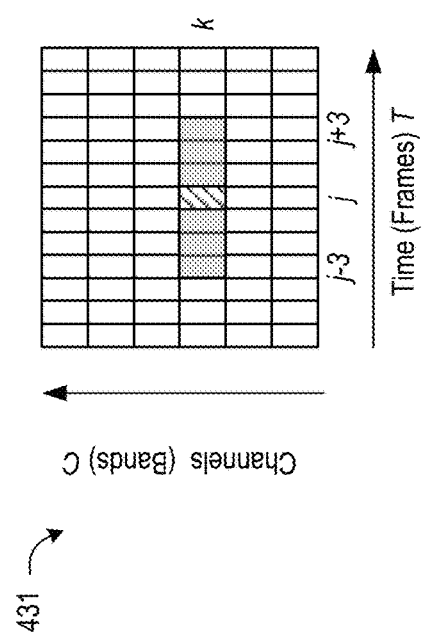
FIG. 4C illustrates a pointwise convolutional filter, according to at least one embodiment.

One example structure of core blocks 430 is illustrated in the top callout portion of FIG. 4A. Each core block may include a block of separable time-channel (T-C) convolutions. For example, a separable T-C convolution may include a layer of one-dimensional (1D) depthwise convolutions 431 performed across multiple times (frames) and fixed channels (e.g., mel-bands). FIG. 4B illustrates a depthwise convolutional filter 7×1 applied to elements (j−3, k) through (j+3, k), according to at least one embodiment. Separable T-C convolutions may further include a layer of pointwise convolutions 432 performed across multiple channels and fixed time frames. Pointwise convolutions 432 may be 1×1 convolutions used to create linear combination of the outputs of depthwise convolutions 431. FIG. 4C illustrates a pointwise convolutional filter 1×3 applied to elements (j, k−1) through (j, k+1), according to at least one embodiment. Separable T-C convolutions may have stride 1 and dilation 1 or some other suitable stride and dilation. Separable T-C convolutions may be followed by a batch normalization layer 433 and a layer of activations 434. With a continuing reference to FIG. 4A, blocks of layers 431-434 may be implemented multiple (R) times within each core block 430. By changing the number R of blocks of layers, the total depth of neural network 400 may be varied. The width of neural network 400 may be varied, e.g., increased or decreased, by varying filter sizes of each core block 430.

The repeated blocks of layers 431-434 may be connected to a squeeze-and-excitation (SE) group 440 whose example structure is illustrated in more detail below in conjunction with FIG. 4D. SE group 440 implements global pooling for context inclusion. The output of the first branch, which includes blocks of layers 431-434 and SE group 440, may be combined with an output of the second branch. The second branch (a skip connection, residual connection, etc.) may include one or more additional layers of pointwise convolutions 436 and a batch normalization layer 437. In some embodiments, combining the two outputs may be performed by average element-wise pooling 446. The combined output may be additionally processed by a layer of activations 447. As a result of operations of encoder stage 410, the channel dimension may change, e.g., from C=80 to C=256, 512, 1024, and so on. The number of repeated blocks may be R=2, 3, 4, or some other number. Filter (kernel) sizes deployed by various convolutions of encoder stage 410 may be 3, 7, 11, 15, or any other suitable size.

Features output by encoder stage 410 may be processed using decoder stage 460. More specifically, an attention pooling layer 470 (which may include a batch normalization operation) may collapse features of size $\tilde{C} \times \tilde{T}$ across the time dimension, $\tilde{C} \times \tilde{T} \rightarrow \tilde{C} \times 1$, to obtain intermediate features. In one example embodiment, $\tilde{C}=3072$. The intermediate features may be processed by a linear layer 480 (which, during training, may also include a batch normalization operation) that applies a convolutional filter to modify (e.g., reduce) the channel dimension $\tilde{C} \rightarrow d$ to obtain speaker embeddings 340 for various utterances in the batch. In one example embodiment, d=192. The described architecture of neural network 400 allows for obtaining fixed-size speaker embeddings from variable-duration speech utterances. A final linear layer 490 may generate logits that determine probabilities of speaker embeddings 340 belonging to one of N classes (e.g., N speakers in the training database). During training, the final linear layer 490 may feed logits into loss function 350, e.g., as described herein at least in conjunction with FIG. 3.

In some embodiments, some of the blocks of FIG. 4A may be performed under some conditions and not performed under other conditions. For example, as indicated with the dashed outlines of the corresponding blocks, linear (logits) layer 490 and loss function 350 may be used during speaker identification training, but not used during speaker verification and/or diarization inference. More specifically, neural network 400 may be trained for speaker identification (e.g., using speaker ground truth 360, as described at least with respect to FIG. 3) and may be deployed, during inference, for speaker verification and/or speaker diarization. In such embodiments, speaker verification and/or diarization inference may be performed directly based on speaker embeddings 340, without linear (logits) layer 490 and loss function 350.

In some embodiments, as similarly indicated with dashed outlines of the corresponding boxes, batch normalization layers 433 are deployed during training (e.g., when batches of multiple training utterances are used) but not during inference (e.g., when various utterances of speech 402 are processed individually). In some embodiments, dropout operations 435 and/or 448 may additionally be used during training. Dropout operations may involve removing at least some neurons from one or more neuron layers and replaced with fixed outputs, e.g., zero outputs. The use of dropout techniques forces the remaining neurons to learn how to perform classification tasks more efficiently. During different training epochs, different sets of neurons (e.g., randomly chosen neurons) may be dropped.

Figure 4D:
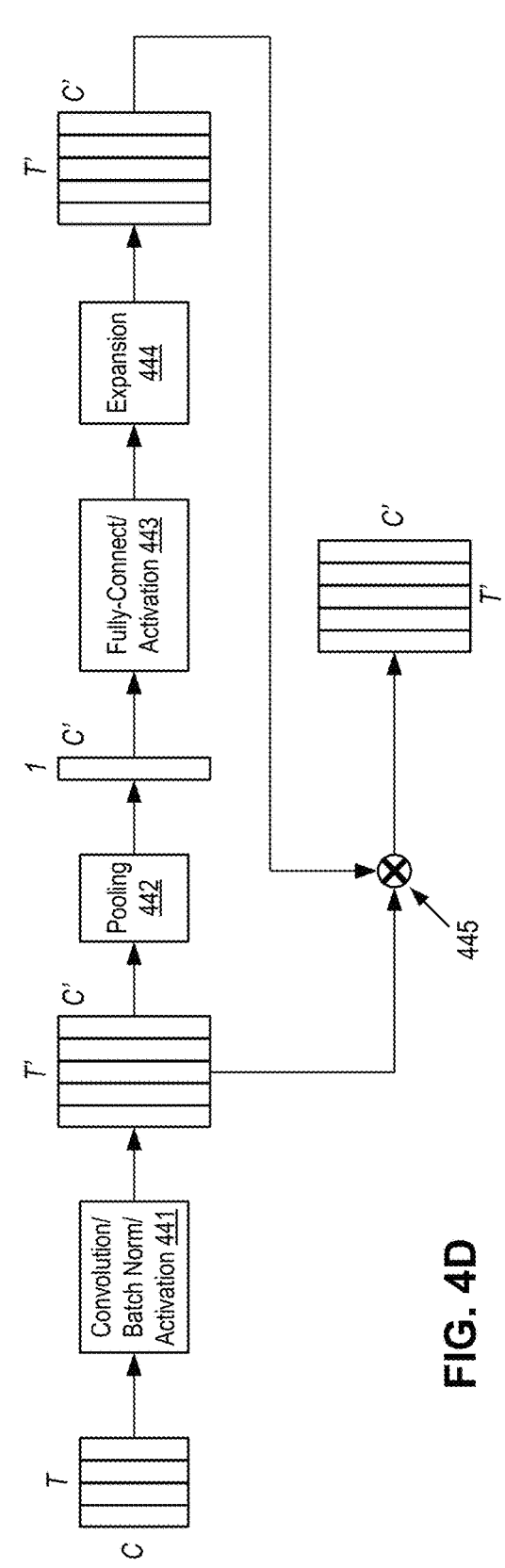
FIG. 4D illustrates schematically a structure of a squeeze-and-excitation block of FIG. 4A, according to at least one embodiment.

FIG. 4D illustrates schematically a structure of SE group 440 of FIG. 4A, according to at least one embodiment. A size of an input into SE group 440 is shown to be C×T although it should be understood that the number of channels C and the number of times T may change in the course of processing by blocks of layers 431-434. SE group 440 may include one or more convolutional layers followed by batch normalization layers and activation layers (shown as group 441), which may further change the number of channels/times, C×T→C'×T'. SE group 440 may include a pooling layer 442, e.g., an average pooling layer, that squeezes the data across various time channels, C'×T' →C'×1. The squeezed data may undergo processing by one, two, or more fully connected layers and may be additionally processed by one or more layers of activations (shown as group 443). The data may undergo expansion 444 across the temporal dimension, C'×1→C'×T', followed by combining the data with a copy of the data input into pooling layer 442. In some embodiments, combining the data may be performed using element-by-element multiplication 445.

Figure 5:
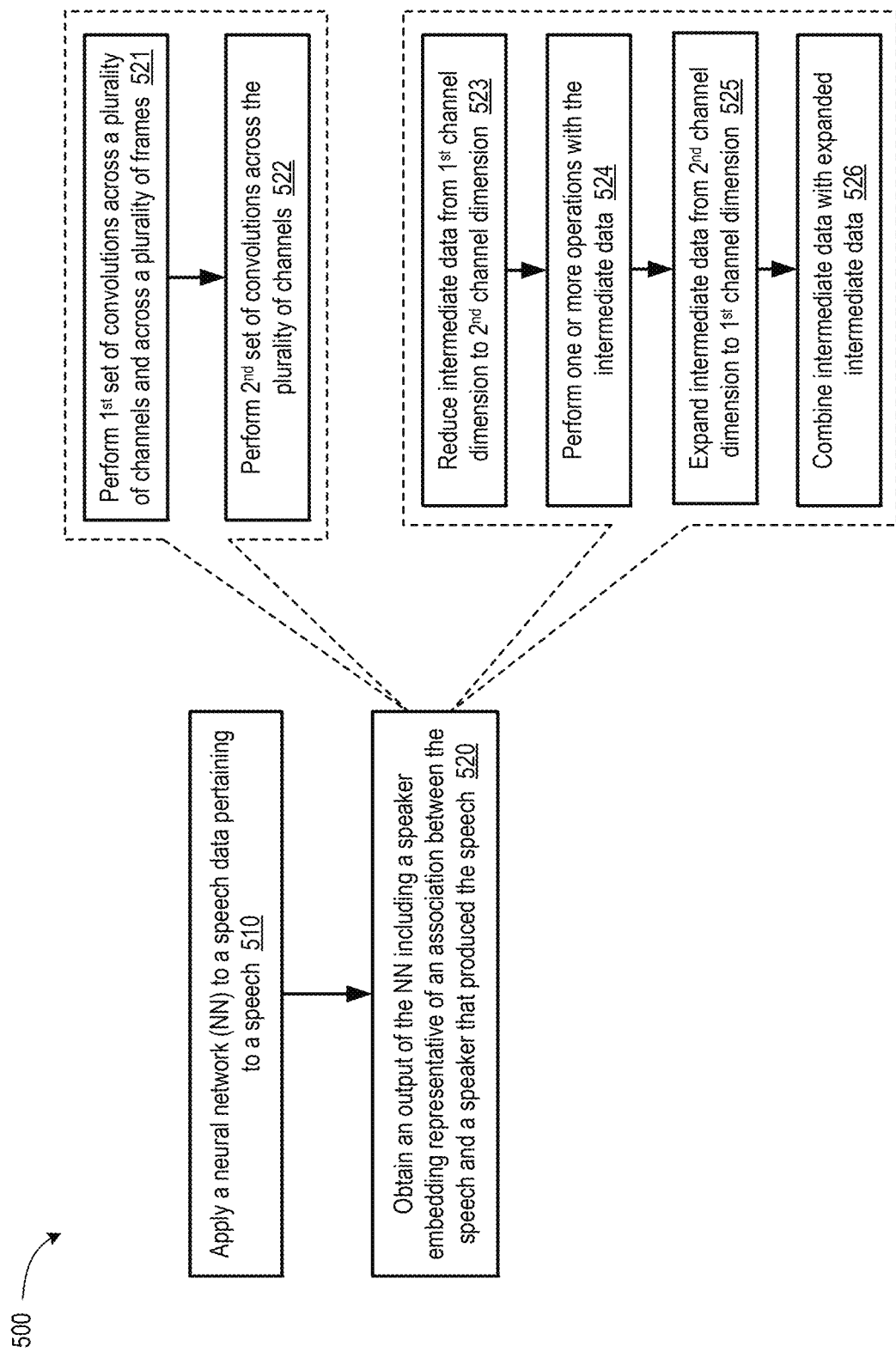
FIG. 5 is a flow diagram of an example method of deploying context-aware neural networks that generate speaker embeddings for efficient speaker identification, verification, and/or diarization, according to some embodiments of the present disclosure.
Figure 6:
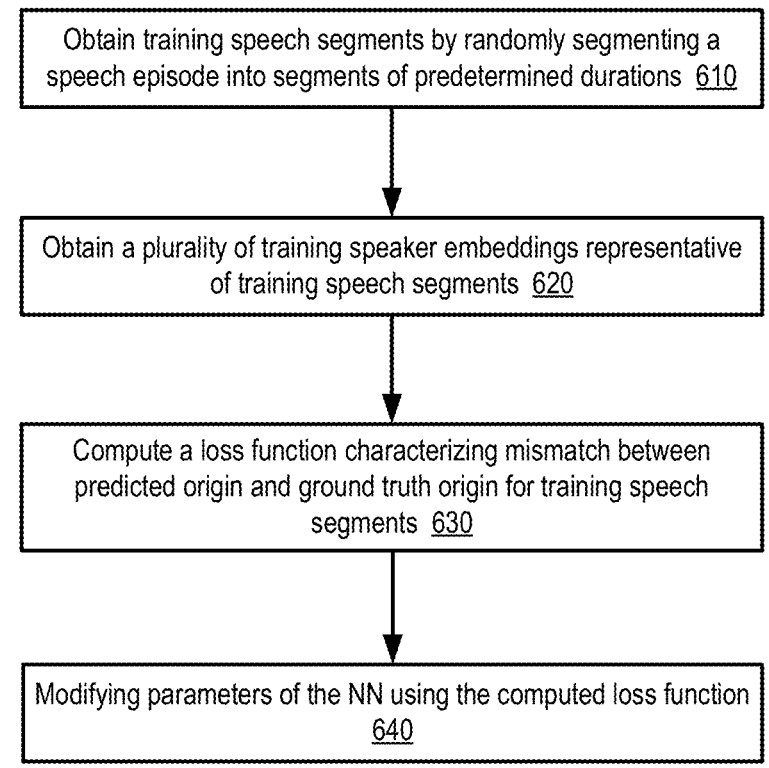
FIG. 6 is a flow diagram of an example method of training context-aware neural networks that generate speaker embeddings for efficient speaker identification, verification, and diarization, according to some embodiments of the present disclosure.

FIGS. 5-6 are flow diagrams of methods 500 and 600 of deploying and training context-aware neural networks that generate speaker embeddings for efficient speaker identification, verification, and/or diarization, according to some embodiments of the present disclosure. Methods 500 and 600 may be performed using one or more processing units (e.g., CPUs, GPUs, accelerators, PPUs, DPUs, etc.), which may include (or communicate with) one or more memory devices. In at least one embodiment, methods 500 and 600 may be performed using processing units of inference server 102 and/or training server 160. In at least one embodiment, processing units performing any of methods 500 and/or 600 may be executing instructions stored on a non-transient computer-readable storage media. In at least one embodiment, any of methods 500 and/or 600 may be performed using multiple processing threads (e.g., CPU threads and/or GPU threads), individual threads executing one or more individual functions, routines, subroutines, or operations of the method. In at least one embodiment, processing threads implementing any of methods 500 and/or 600 may be synchronized (e.g., using semaphores, critical sections, and/or other thread synchronization mechanisms). Alternatively, processing threads implementing any of methods 500 and/or 600 may be executed asynchronously with respect to each other. Various operations of any of methods 500 and/or 600 may be performed in a different order compared with the order shown in FIG. 5 and/or FIG. 6. Some operations of any of methods 500 and/or 600 may be performed concurrently with other operations. In at least one embodiment, one or more operations shown in FIG. 5 and/or FIG. 6 may not always be performed.

Methods 500 and 600 may be performed in the context of speech identification, speech verification, and/or speech diarization. In some embodiments, neural network models trained to perform speaker identification (e.g., using method 500) may be deployed to perform speaker identification and/or speaker diarization (e.g., using method 600). Methods 500 and/or 600 may involve speech utterances produced by people in any possible context, e.g., a conversation, a public speech, a public event, a business meeting, a conference, a street encounter, an interaction in a game, an interaction with a chat bot or digital avatar, an interaction with an in-vehicle infotainment system, and/or the like. "Speech," as used in the context of methods 500 and/or 600 should be understood as including sounds of non-human origins, e.g., sounds of animals. "Speech," as used in the context of methods 500 and/or 600 should also be understood as including sounds produced by non-living entities, including natural forces, such as wind, sea, ocean, thunderstorms, and various other atmospheric or naval phenomena, as well as robots, synthesized or computer generated speech, etc. "Speech," as used in the context of methods 500 and/or 600 should further be understood as including artificial sounds, such as sounds of vehicles, industrial equipment, and so on. Similarly, a "speaker" should be understood as any entity (real or virtual) that generates speech.

FIG. 5 is a flow diagram of an example method 500 of deploying context-aware neural networks to generate speaker embeddings for efficient speaker identification, verification, and/or diarization, according to some embodiments of the present disclosure. At block 510, one or more processing units executing method 500 may apply a neural network (NN) to a speech data pertaining to a speech. The NN used by method 500 may include at least one block of neurons (e.g., core block 430 in FIG. 4A) that includes a first branch (e.g., blocks of layers 431-434 in FIG. 4A) and a second branch (e.g., layers 436 in FIG. 4A) that is parallel to the first branch. In some embodiments, the speech data processed by the NN may include a plurality of frames. Individual frames of the plurality of frames may be associated with a respective time interval of a plurality of time intervals of the speech. Individual frames of the plurality of frames may include one or more of channels representative of spectral content of the respective time interval of the speech. In some embodiments, individual channels may be associated with a corresponding mel-band of a plurality of mel-bands of the respective time interval of the speech.

At block 520, method 500 may continue with the one or more processing units obtaining an output of the NN. The output of the NN may include a speaker embedding representative of an association between the speech and a speaker that produced the speech. As indicated with the top callout portion of FIG. 5, obtaining the output of the NN may include a number of NN processing operations. More specifically, as indicated by block 521, obtaining the output of the NN may include using an output of the first branch that performs at least a first set of convolutions of the speech data across the plurality of channels and across the plurality of frames. As indicated by block 522, obtaining the output of the NN may include obtaining an output of the second branch that performs at least a second set of convolutions of the speech data across the plurality of channels.

In some embodiments, the first set of convolutions may be performed multiple times within the block of neurons (e.g., the blocks of layers 431-434 may be performed R times, as shown in FIG. 4A), and the dashed encoder stage 410 may include two or more core blocks 430 (as shown in FIG. 4A). In some embodiments, the NN may include two or more of the blocks of neurons (e.g., encoder stage 410 may include two or more core blocks 430).

In some embodiments, the first branch of the block of neurons may include a squeeze-and-excitation (SE) group of neurons (e.g., SE group 440 in FIG. 4A and FIG. 4D). The SE group of neurons may be configured to perform operations illustrated with the bottom callout portion of FIG. 5. Specifically, at block 523, the SE group of neurons may reduce an intermediate data from a first channel dimension to a second channel dimension (e.g., at pooling layer 442 in FIG. 4D). At block 524, the SE group of neurons may perform one or more operations with the intermediate data (e.g., operations of fully-connected layers and activation layers of group 443 in FIG. 4D). At block 525, the SE group of neurons may expand the intermediate data from the second channel dimension to the first channel dimension (expansion 444 in FIG. 4D), and at block 526, the SE group of neurons may combine the intermediate data with the expanded intermediate data (e.g., via multiplication 445) to generate an output of the SE group. In some embodiments, obtaining the output of the first branch may include combining the output of the SE group of neurons with the output of the second branch using an average pooling operation (e.g., average element-wise pooling 446 in FIG. 4A).

A speaker embedding produced by the NN may be used for a number of tasks. For a speaker identification task, a speaker embedding produced by the NN may be indicative of an identification of the speaker within a database of speakers, individual speakers in the database of speakers represented using a set of one or more stored speaker embeddings. For a speaker diarization task, a speaker embedding produced by the NN may be indicative of a distinction of the speaker from one or more additional speakers in a common speech episode. The common speech episode may include the speech, and one or more additional speech utterances produced by the one or more additional speakers. For a speaker verification task, the speaker embedding produced by the NN may be indicative of a confirmation that the speaker has produced an additional speech characterized by an additional embedding generated by applying the NN to an additional speech.

FIG. 6 is a flow diagram of an example method 600 of training context-aware neural networks that generate speaker embeddings for efficient speaker identification, verification, and/or diarization, according to some embodiments of the present disclosure. At block 610, one or more processing units executing method 600 may obtain a plurality of training speech segments. At least some of the plurality of training speech segments may be obtained by randomly segmenting a speech episode into segments of one of a plurality of predetermined durations. At block 620, method 600 may include obtaining, using the NN, a plurality of training speaker embeddings. Individual training speaker embeddings may be representative of a respective training speech segment of the plurality of training speech segments. At block 630, the one or more processing units performing method 600 may compute a loss function characterizing a mismatch between a predicted origin (e.g., a predicted speaker) and a ground truth origin (e.g., an actual or ground truth speaker) for each of the plurality of training speech segments. At block 640, the one or more processing units performing method 600 may modify parameters of the NN using the computed loss function.

Training of the context-aware NNs may be performed using a number of variants of method 600. In one embodiment, a context-aware NN may be trained to perform speaker identification and may be subsequently deployed for speaker verification and/or diarization inferences. More specifically, the plurality of training speech segments may be annotated with a ground truth that includes correct classifications (e.g., speaker identities) of the respective training speech segments. Correspondingly, the loss function computed as part of block 630 may include a plurality of contributions, each of the plurality of contributions characterizing, for the respective training speech segment of the plurality of training speech segments, a mismatch between a predicted speaker and a ground truth speaker of the respective training speech segment (e.g., as described in conjunction with FIG. 3). In some embodiments, the loss function may be (or include) an angular softmax marginal loss function.

In some embodiments, a context-aware NN may be directly trained to perform speaker verification and/or diarization. More specifically, the NN being trained may generate a first training speaker embedding $E_1$ representative of a first association between a first training speech segment of the plurality of training speech segments and a first speaker. The NN may further generate a second training speaker embedding $E_2$ may be representative of a second association between a second training speech segment of the plurality of training speech segments and a second speaker. In some embodiments, the loss function may be a cosine similarity loss function (e.g., $\cos(E_1, E_2) = (E_1 \cdot E_2)/(|E_1||E_2|)$). Modifying parameters of the NN, at block 640, may include causing the cosine similarity between the first training speaker embedding $E_1$ and the second training speaker embedding $E_2$ (or any other loss function representative of a difference between $E_1$ and $E_2$) to evolve in a first direction (e.g., increase), if the first speaker is the same as the second speaker. Similarly, modifying parameters of the NN may include causing the cosine similarity (or any other loss function) between the first training speaker embedding and the second training speaker embedding to evolve in a second direction (e.g., decrease), if the first speaker is different from the second speaker. During inference, a cosine similarity exceeding a certain threshold $\cos(E_1, E_2) > T$ may be indicative of the same speaker producing the utterances characterized by speaker embeddings $E_1$ and $E_2$, and the cosine similarity below the threshold $\cos(E_1, E_2) < T$ may be indicative of different speakers producing the corresponding utterances.

The systems and methods described herein may be used for a variety of purposes, by way of example and without limitation, for performing one or more operations with respect to machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Inference and Training Logic

Figure 7A:
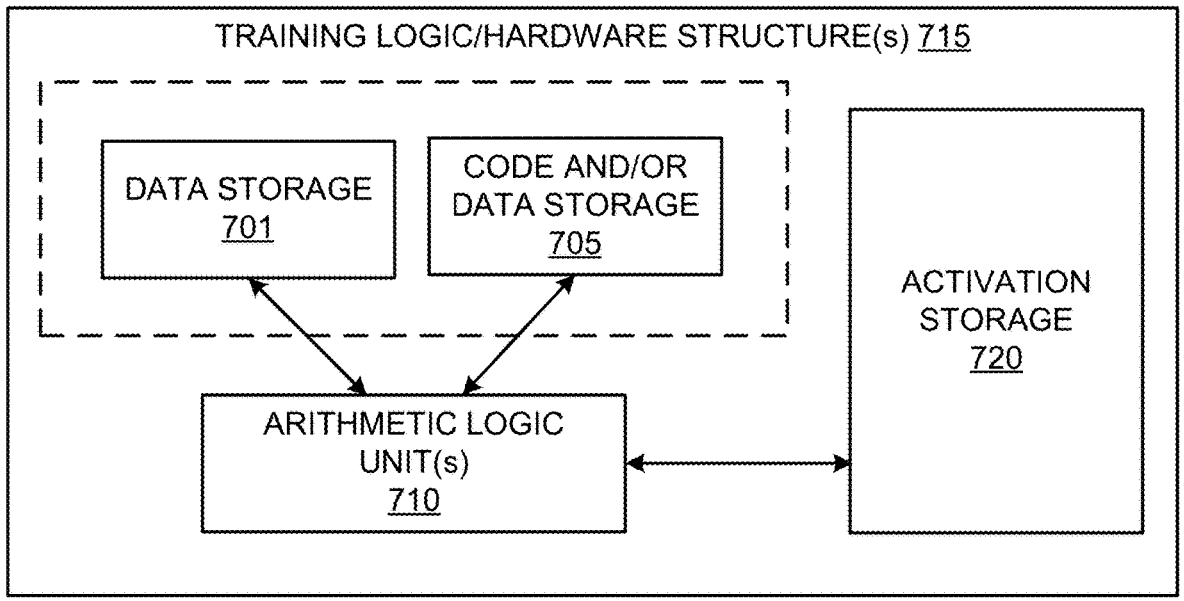
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
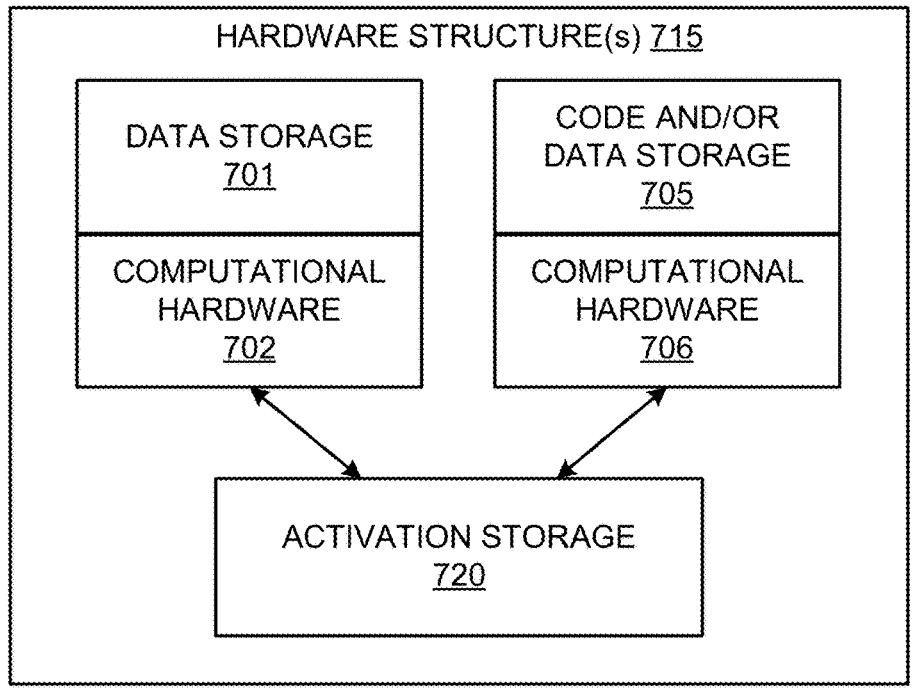
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
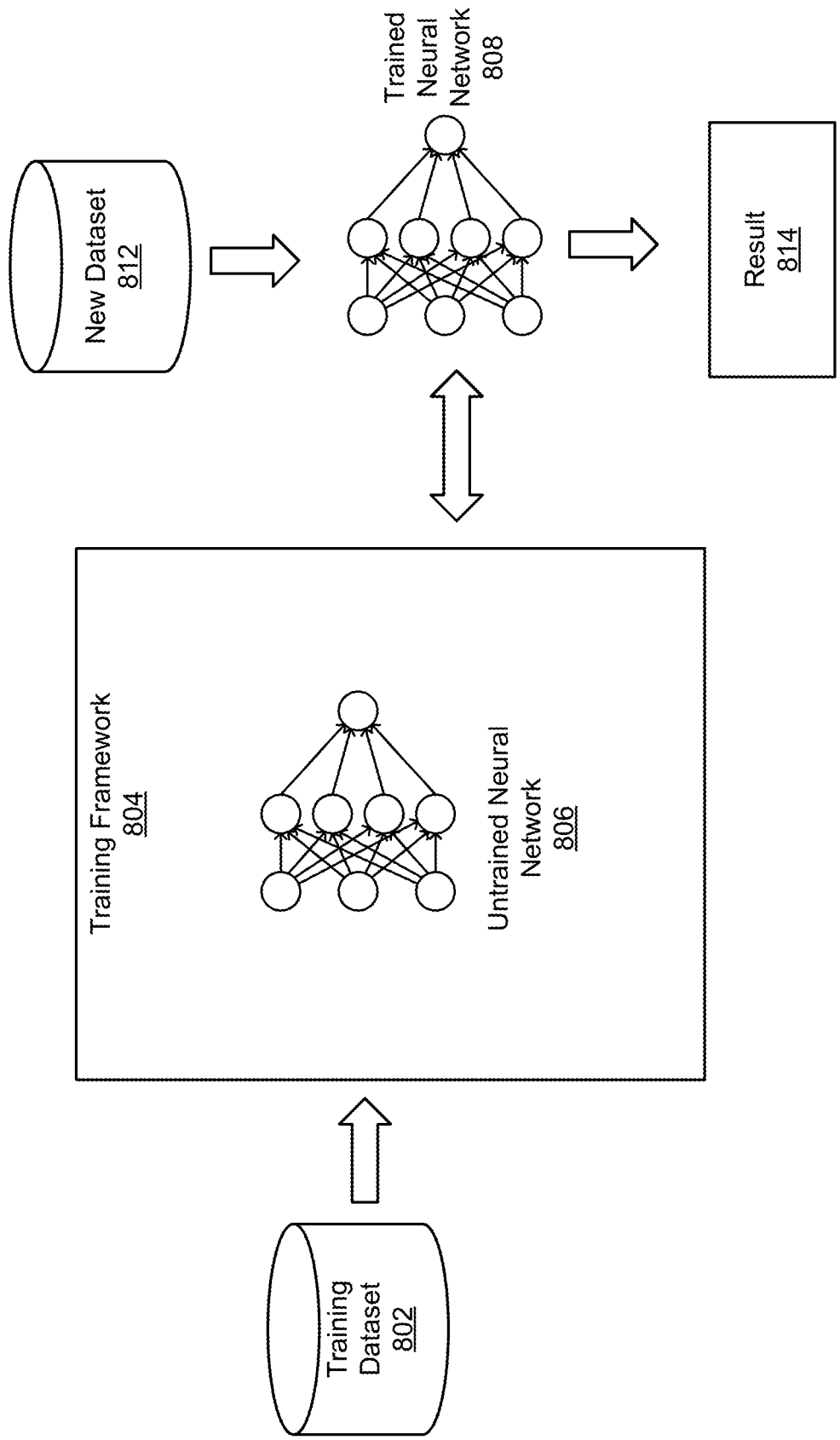
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
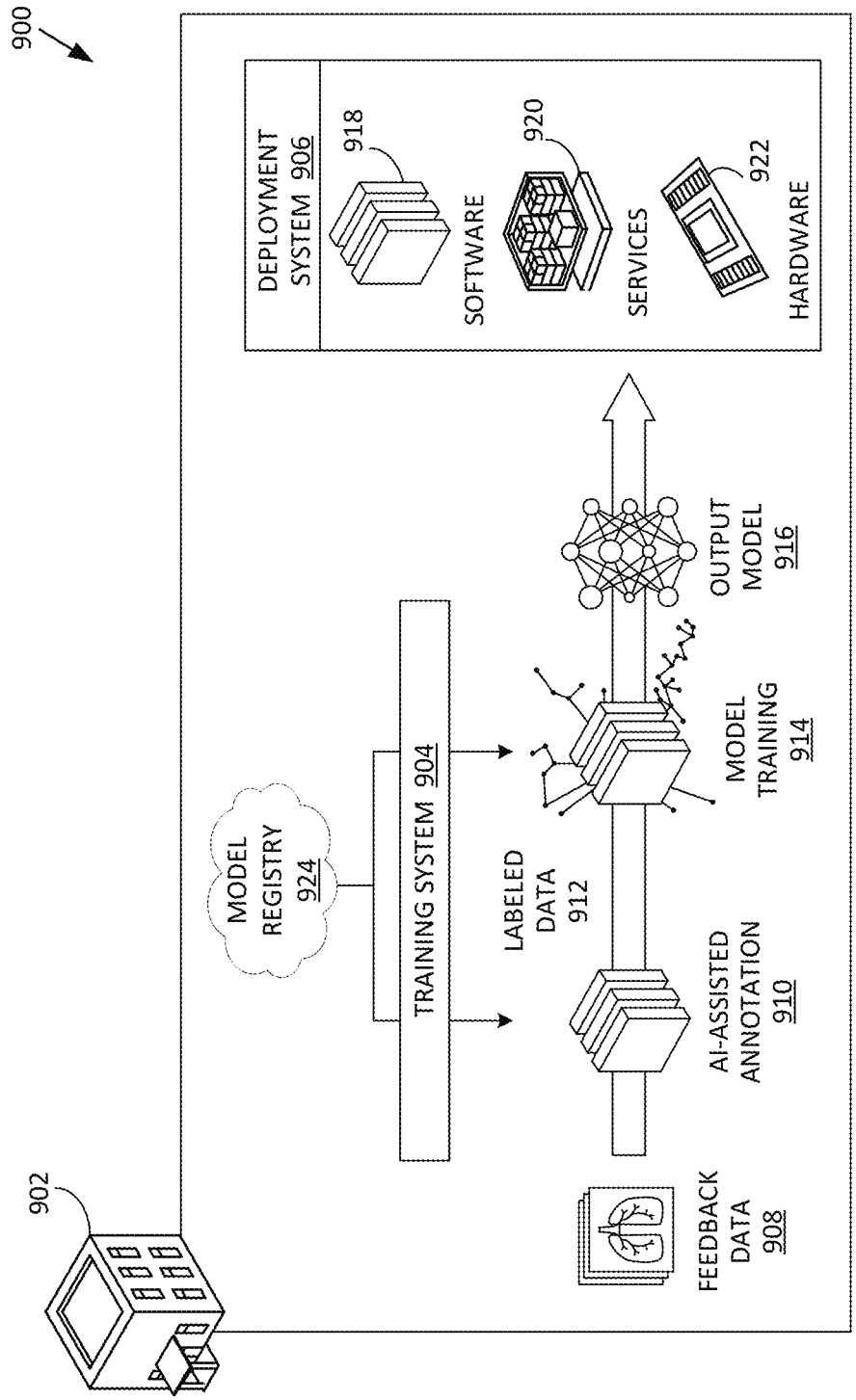
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
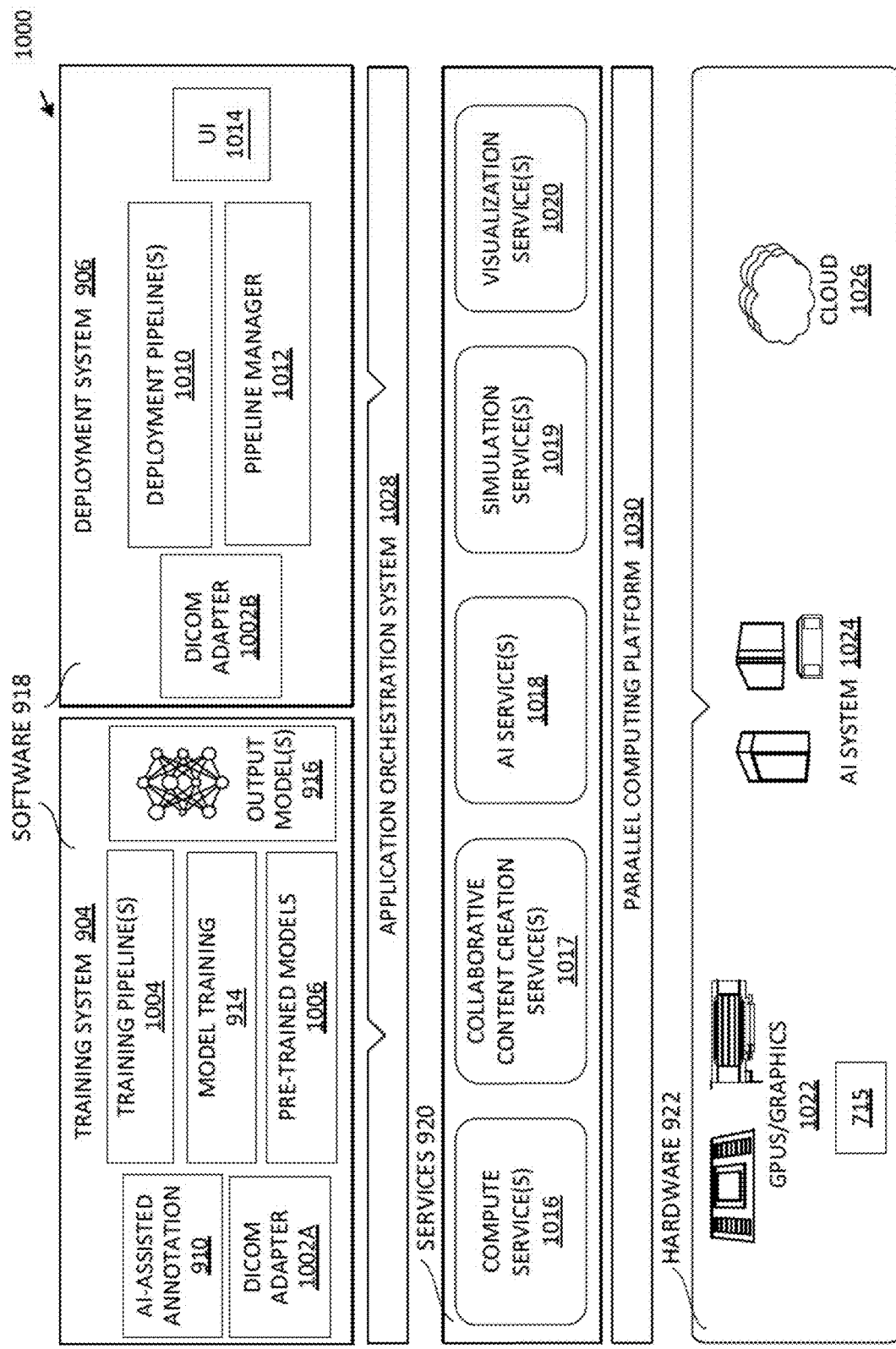
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turn-around time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA ° and/or QUADRO ° GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    applying speech data representative of a plurality of channels of spectral content to a neural network (NN), the NN including a first branch and a second branch parallel to the first branch; and
    computing, using the NN and based at least on the speech data, an output including a speaker embedding representative of an association between the speech data and a speaker that produced speech corresponding to the speech data, the output being computed based at least on:
        a first output of the first branch computed using at least a first set of convolutions with respect to the speech data, the first set of convolutions comprising a first subset of convolutions across a plurality of frames of speech data for one or more fixed channels and a second subset of convolutions across the plurality of channels for one or more fixed frames; and
        a second output of the second branch computed using at least a second set of convolutions with respect to the speech data and across the plurality of channels.

2. The method of claim 1, wherein the speaker embedding is indicative of at least one of: an identification of the speaker within a database of speakers, at least one individual speaker in the database of speakers represented using a set of one or more stored speaker embeddings;
    a confirmation that the speaker has produced an additional speech characterized using an additional embedding generated using the NN; or
    a distinction of the speaker from one or more additional speakers in a common speech episode that includes the speech and one or more additional speech instances produced by the one or more additional speakers.

3. The method of claim 2, wherein the first branch includes a squeeze-and-excitation (SE) group of neurons, the SE group of neurons to perform operations comprising:
reducing an intermediate data from a first channel dimension to a second channel dimension;
performing one or more operations using the intermediate data;
expanding the intermediate data from the second channel dimension to the first channel dimension; and
combining the intermediate data with the expanded intermediate data.

4. The method of claim 3, wherein the first output of the first branch includes a third output of the SE group of neurons, and wherein the third output of the SE group of neurons is combined with the second output of the second branch using an average pooling operation.

5. The method of claim 1, wherein the NN includes two or more blocks of neurons, wherein individual blocks of the two or more blocks of neurons include the first branch and the second branch.

6. The method of claim 1, wherein the first set of convolutions is performed multiple times.

7. The method of claim 1, wherein
the second subset of convolutions is sequential to the first subset of convolutions.

8. The method of claim 1, wherein at least individual channel of the plurality of channels is associated with a corresponding mel-band of a plurality of mel-bands of a respective time interval corresponding to the speech data.

9. The method of claim 1, wherein the NN is trained using a plurality of training speech segments, and further wherein at least one of the plurality of training speech segments is segmented among a plurality of predetermined segment durations from a common speech episode.

10. The method of claim 9, wherein the NN is trained, at least, by:
obtaining a plurality of training speaker embeddings, wherein at least one individual training speaker embedding is representative of a predicted speaker of a respective training speech segment of the plurality of training speech segments;
computing an angular softmax margin loss function comprising a plurality of contributions, at least one individual contribution of the plurality of contributions characterizing, for the respective training speech segment, a mismatch between the predicted speaker and a ground truth speaker of the respective training speech segment; and
modifying one or more parameters of the NN using the computed angular softmax margin loss function.

11. The method of claim 9, wherein the NN is trained, at least, by:
obtaining a first training speaker embedding representative of a first association between a first training speech segment of the plurality of training speech segments and a first speaker;
obtaining a second training speaker embedding representative of a second association between a second training speech segment of the plurality of training speech segments and a second speaker; and
modifying one or more parameters of the NN to:
cause a cosine similarity between the first training speaker embedding and the second training speaker embedding to increase when the first speaker is the same as the second speaker, or cause the cosine similarity between the first training speaker embedding and the second training speaker embedding to decrease when the first speaker is different from the second speaker.

12. A method comprising:
determining a plurality of training speech segments based at least on randomly segmenting a speech episode, according to at least two predetermined durations;
computing, using a neural network (NN) and based at least on a first training speech segment of the plurality of training speech segments, a first training speaker embedding corresponding to the first training speech segment associated with a first speaker;
computing a loss function characterizing a similarity between the first training speaker embedding and a second training speaker embedding corresponding to a second training speech segment of the plurality of training speech segments, the second training speech segment associated with a second speaker; and
updating one or more parameters of the NN using to cause the computed loss function to change:
in a first direction responsive to the first speaker being the same as the second speaker, or
in a second direction responsive to the first speaker being different from the second speaker.

13. The method of claim 12, wherein the loss function includes a plurality of contributions, individual contributions of the plurality of contributions characterizing, for a respective training speech segment of the plurality of training speech segments, a mismatch between a predicted speaker and a ground truth speaker of the respective training speech segment.

14. The method of claim 12, wherein the loss function comprises an angular softmax marginal loss function.

15. The method of claim 12, wherein individual training speech segments of the plurality of training speech segments are represented using a plurality of frames, wherein individual frames of the plurality of frames (i) are associated with a respective time segment of a plurality of time segments of a corresponding training speech segment and (ii) include a plurality of channels representative of spectral content of the respective time segment of the corresponding training speech segment, and wherein the NN comprises a plurality of blocks, individual blocks of the plurality of blocks including:
a first branch of neurons performing a first set of convolutions across the plurality of channels and across the plurality of frames, and
a second branch of neurons performing a second set of convolutions across the plurality of channels, and wherein the second branch of neurons is parallel to the first branch of neurons.

16. A system comprising:
one or more processing units to:
apply a neural network (NN) to a speech data pertaining to a speech, wherein the NN comprises a first branch and a second branch parallel to the first branch, and wherein the speech data is representative of a plurality of channels and comprises a plurality of frames; and
obtain an output of the NN comprising a speaker embedding representative of an association between the speech and a speaker that produced the speech, wherein the output is based at least on:
an output of the first branch performing at least a first set of convolutions comprising a first subset of convolutions across the plurality of frames of the speech data for one or more fixed channels and a second subset of convolutions across the plurality of channels for one or more fixed frames, and an output of the second branch performing at least a second set of convolutions of the speech data across the plurality of channels.

17. The system of claim 16, wherein the speaker embedding is indicative of at least one of:

an identification of the speaker within a database of speakers, each speaker in the database of speakers represented by a set of one or more stored speaker embeddings;

a confirmation that the speaker has produced an additional speech characterized by an additional embedding generated by applying the NN to an additional speech; or a distinction of the speaker from one or more additional speakers in a common speech episode that comprises:
the speech, and
one or more additional speech instances produced by the one or more additional speakers.

18. The system of claim 16, wherein the first branch comprises a squeeze-and-excitation (SE) group of neurons, and wherein to perform computations for the SE group of neurons, the one or more processing units are to:

reduce an intermediate data from a first channel dimension to a second channel dimension;

perform one or more operations with the intermediate data;

expand the intermediate data from the second channel dimension to the first channel dimension; and combine the intermediate data with the expanded intermediate data.

19. The system of claim 16, wherein the system is comprised in at least one of:

an in-vehicle infotainment system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, mixed reality content, or augmented reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *